Patented Nov. 12, 1940

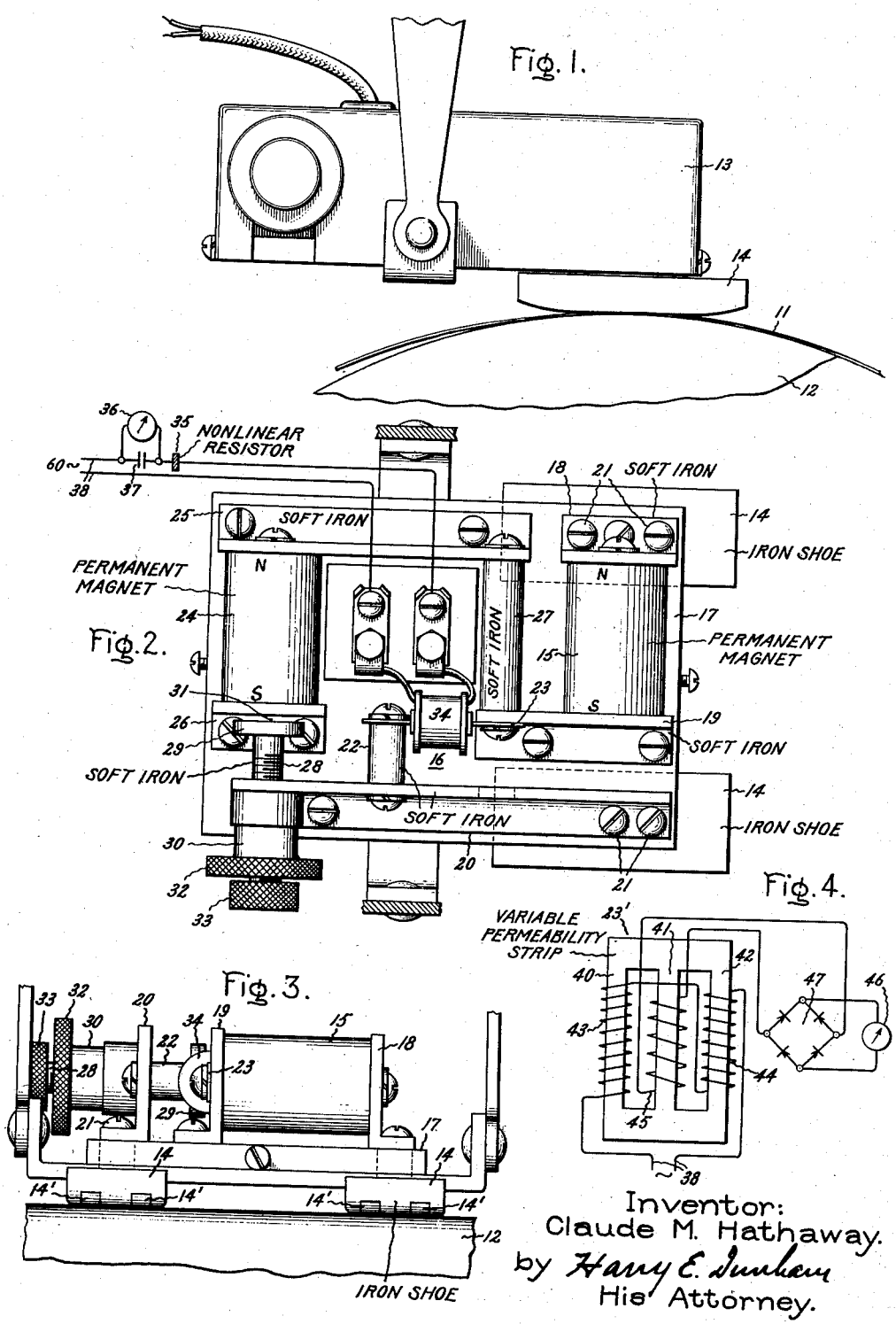

2,221,516

UNITED STATES PATENT OFFICE 2,221,516

CONTINUOUS THICKNESS GAUGE

Claude M. Hathaway, Niskayuna, N. Y., assignor to General Electric Company, a corporation of New York Application April 1, 1937, Serial No. 134,330

5 Claims. (Cl. 33—148)

My invention relates to electric gauges and concerns particularly continuous thickness gauges.

It is an object of my invention to provide an improved, simple, and rugged gauge for continuously measuring the thickness of materials in sheet form.

It is an object of my invention to provide apparatus which is particularly adapted for measuring and controlling the thickness of paper and other sheeting composed of resilient or nonresilient, nonmagnetic material such as rubber and fabric.

It is a further object of my invention to provide apparatus which may either be operated on the null principle or may be calibrated for direct reading.

Other and further objects and advantages will become apparent as the description proceeds.

In carrying out my invention in its preferred form, I cause the paper or other sheet material, which is to be gauged, to pass over a roller or a smooth platen composed of steel or other magnetizable material and I provide a magnetic gauge head adapted to ride upon the outer surface of the material being gauged so that the material forms an air gap between the steel roller and the gauge head. The gauge head includes apparatus for passing a unidirectional magnetic flux through the material being gauged and means for measuring the magnitude of the flux. Variations in thickness of the material being gauged obviously vary the magnetic reluctance and the magnitude of the magnetic flux so that a measurement of the flux provides an indication of the thickness of the material.

The invention may be understood more readily from the following detailed description when considered in connection with the accompanying drawing and those features of the invention which are believed to be novel and patentable will be pointed out in the claims appended hereto. In the drawing, Fig. 1 is a side view of an embodiment of my invention showing fragmentarily a paper-carrying roller and a strip of paper being gauged; Fig. 2 is a plan view of the apparatus of Fig. 1 with the cover removed; Fig. 3 is an end view of the apparatus of Fig. 2; and Fig. 4 is a schematic diagram illustrating a modification in the part of the apparatus of Figs. 1, 2, and 3 utilized for measuring the flux passed through the material being gauged. Like reference characters are utilized throughout the drawing to designate like parts.

Referring now more in particular to the drawing, a sheet of material 11, such as paper, is arranged to pass over a roller 12 or a stationary platen, preferably the former, composed of steel or other magnetizable material. A gauge head 13 is provided having a pair of shoes 14 composed of magnetizable material, such as soft iron, cooperating with the roller 12 and adapted to ride upon the outer surface of the sheet 11. If desired, the shoes 14 may be provided with wear-resisting inserts 14' composed of suitable material, such as cemented tungsten-carbide of the type described in Patents Nos. 1,721,416 and Re. 17,624 to Schroter. Within the gauge head 13, there is a permanent magnet 15 for passing magnetic flux through the sheet being gauged, and there is a device 16, to be described more in detail hereinafter, for measuring the flux produced by the permanent magnet 15. The use of a permanent magnet and unidirectional flux has the advantage over the use of alternating-current windings and alternating flux that the measurement is unaffected by the presence of electrically-conducting material in the sheet 11 being gauged, and metallic sheets may be gauged if desired.

A base 17 of nonmagnetic material is provided for mounting the parts of the gauge head 13. The permanent magnet 15 is mounted between a pair of soft iron brackets 18 and 19 carried by the base 17. The base 17 also carries a soft iron bracket 20, and screws 21 composed of iron or other magnetizable material are provided for fastening one of the shoes 14 to the bracket 18 and the other shoe 14 to the bracket 20. To complete the magnetic circuit, a soft iron stud 22 and a strip of magnetizable material 23 are provided. The stud 22 is carried by the bracket 20 and the strip 23 joins the stud 22 to the iron bracket 19. The strip 23 forms a part of the flux-measuring device 16 and is preferably composed of magnetic material varying appreciably in permeability with variations in flux density, such as an alloy of seventy-eight and one-half per cent nickel and the remainder iron as described in Patent No. 1,586,884 to Elmen.

In order to obtain greater precision of flux measurement and to permit the use of the null method, if desired, a second permanent magnet 24 is preferably provided for passing magnetic flux through the strip 23 in the opposite direction from that of the flux produced by the magnet 15. The magnet 24 is mounted between a pair of soft iron brackets 25 and 26 carried by the base 17 and a soft iron stud 27 is mounted between the bracket 25 and the bracket 19. An adjustable member, such as a screw 28 threaded into the bracket 20 and having an end 29 of increased diameter, is provided for forming an adjustable air gap 31 in the magnetic circuit of the magnet 24. The screw 28 is so mounted that its end 29 is adjacent the end of the magnet 24 carried by the bracket 26. If desired, an internally and externally threaded bushing 30 having coarse external threads and fine internal threads, or vice versa, may be provided for carrying the screw 28 upon the bracket 20 in order to provide both coarse and fine adjustment of the air gap 31. It will be observed that the screw 28 and the bushing 30 are provided with knurled adjusting heads 32 and 33, respectively.

The flux-measuring device 16 includes the variable permeability strip 23, a coil 34 linking the strip 23, a nonlinear impedance or resistor 35 composed of material such as a mixture of silicon-carbide and carbon with a suitable binder as described in United States Patent No. 1,822,742 to McEachron, a direct-current instrument 36 shunted by a condenser 37, and a source of alternating current 38 to which the coil 34, the resistor 35, and the instrument 36 are connected in series. Although I have described apparatus utilizing an indicating instrument 36, it will be understood that my invention is not limited to this precise arrangement but obviously includes the use of telemeters, recorders, relays, automatic paper-thickness controlling apparatus and the like.

In making measurements of paper thickness, the apparatus may be operated in one of several ways. For example, if direct readings are desired of all thicknesses from zero up, the air gap 31 may be so adjusted as to obtain a zero reading in the instrument 36 when the shoes 14 are resting directly upon the roller 12 without any sheet 11 interposed. On the other hand, if a purely null method of measurement is desired, the screw 28 may be calibrated in terms of paper thickness by determining the magnitudes of the air gap 31 required to obtain zero deflection in the instrument 36 for various paper thicknesses. Ordinarily, however, I prefer to adjust the air gap 31 for a standard thickness of sheet to be gauged and to calibrate the instrument 36 in terms of deviations from such a standard thickness.

The principle of operation of the apparatus will be apparent from a consideration of the flux paths provided. The magnetic circuit of the permanent magnet 15 may be traced from its north magnetic pole at the bracket 19 through the bracket 19, the variable permeability strip 23, the stud 22, the bracket 20, the magnetic screws 21, the iron shoe 14, the steel roller 12, the second iron shoe 14, the iron screws 21, the bracket 18, back to the south pole of the magnet 15. The magnetic circuit of the permanent magnet 24 may be traced from its north magnetic pole at the bracket 26 across the air gap 31, through the screw 28, the bracket 20, the stud 22, the variable permeability strip 23, the bracket 19, the stud 27, the bracket 25, back to the south pole of the permanent magnet 24. It will be observed that the permanent magnets 15 and 24 tend to produce flow of flux in opposite directions through the variable permeability strip 23.

The measurement of flux in the strip 23 in the apparatus illustrated in Fig. 2 depends upon the unbalance in the impedance of the coil 34 produced by unidirectional magnetization of the strip 23. Since the current source 38 is an alternating current source, any unidirectional magnetization of the strip 23 will produce lack of symmetry of the wave of alternating current flowing through the coil 34. The unsymmetrical current flowing through the nonlinear resistor 25 will cause a difference in its resistance to opposite polarities of the current wave, thus causing a unidirectional component to appear in the voltage across the resistor. The condenser 37 permits the alternating-current component to pass around the instrument 36.

The apparatus may be calibrated by placing a sheet of standard thickness between the roller 12 and the shoes 14 and then adjusting the air gap 31 by turning the screw 28 until the instrument 36 reads zero. Deviations in thickness of the sheet 11 will thereupon produce unbalance in the effects of the permanent magnets 15 and 24, causing a unidirectional flux of one polarity or the other to pass through the strip 23 depending in magnitude upon the amount of the deviation in thickness. The direction and magnitude of deflection of the instrument 36 will accordingly serve to indicate the direction and extent of deviation in thickness of the sheet being gauged.

Although I have described and illustrated a form of flux-measuring device 16 which I find to be satisfactory, it will be understood that my invention is not limited to this precise arrangement. For example, if desired, I may utilize a modified form of flux-measuring device, such as that shown schematically in Fig. 4.

In the arrangement of Fig. 4, the variable permeability strip 23', which joins the bracket 19 and the stud 22 of Fig. 2, is divided to form three legs 40, 41, and 42. An exciting winding 43 is provided which may consist of two parts, 43 and 44, so connected as to send flux in a circuit around through the outer legs 40 and 42, and a detecting winding 45 may be provided which is responsive to the net flux flowing through the middle leg 41. A suitable current or voltage responsive instrument is provided for detecting the voltage induced in the winding 45, and this instrument may take the form of a rectifier instrument including a direct-current measuring device 46 and a full-wave rectifier 47. It will be apparent that the three-legged strip 23' is subjected to both an alternating magnetomotive force provided by the winding 43, 44 and a unidirectional magnetomotive force provided by the unbalancing effects of the permanent magnets 15 and 24. The magnetomotive forces aid in one outer leg and oppose in the other at any given instant so that unequal permeabilities result and alternating flux is diverted to the middle leg 41, giving rise to an unsymmetrical flux wave therein. Accordingly, a double-frequency voltage will be induced in the winding 45 in case there is any unbalance in the effects of the magnets 15 and 24. The flux-measuring device of Fig. 4 does not constitute a part of my invention but is similar in operation to that described in connection with Figs. 1 and 3 of Patent No. 2,053,154 to La Pierre.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A continuous sheet-thickness indicator comprising in combination, a roller composed of magnetic material over which a sheet of material to be gauged is adapted to pass, and a gauge head movably mounted adjacent said roller, said gauge head including a pair of shoes composed of magnetizable material adapted to ride upon the outer surface of the sheet passing over said roller, a permanent magnet, a strip of variable permeability magnetic material, connecting magnetic pieces for forming said magnet, variable permeability magnetic strip, shoes, and roller into a continuous magnetic circuit broken only by the gaps produced between said shoes and said roller by the sheet of material being gauged, a second permanent magnet, a pair of relatively movable pieces forming an adjustable air gap, connecting magnetic pieces for forming a magnetic circuit through said second magnet, across said adjustable air gap, and through said variable permeability strip, the polarities of said magnets with respect to the flow of magnetic flux through said variable permeability magnetic strip being opposite, and means responsive to variations in flux in said variable-permeability strip.

2. In a continuous sheet-thickness indicator a member composed of magnetic material over which a sheet to be gauged is adapted to pass, and a gauge head movably mounted adjacent said member, said gauge head including a pair of shoes composed of magnetic material adapted to ride upon the surface of the sheet, a permanent magnet, a strip of magnetic material adapted to have the flux therein measured, connecting magnetic pieces for forming said magnet, magnetic strip, shoes, and magnetic member into a continuous magnetic circuit broken only by the gaps produced between said shoes and said member by the sheet of material being gauged, a second permanent magnet, a pair of pieces forming an adjustable air gap, and connecting magnetic pieces for forming a magnetic circuit through said second magnet, across said adjustable air gap, and through said magnetic strip, the polarities of said magnets with respect to the flow of magnetic flux through said magnetic strip being opposite.

3. In a thickness gauge, a member composed of magnetic material, and a gauge head, said gauge head and magnetic member being relatively movable, biased toward each other, and adapted to have sheet material to be gauged passed therebetween, said gauge head including a flux-carrying element, a permanent magnet for passing a unidirectional magnetic flux through said sheet to be gauged and said element, and a second permanent magnet mounted so as to tend to pass magnetic flux through said element in the opposite direction.

4. A thickness gauge comprising in combination, a magnetic member, and a gauge head, relatively movable and biased toward each other, between which a sheet to be gauged is adapted to be passed and to vary the spacing of the magnetic member and gauge head in accordance with variations in thickness of the sheet, said gauge head including a permanent magnet for passing unidirectional magnetic flux through said sheet to be gauged and means responsive to the magnitude of the flux.

5. In a thickness gauge a member composed of magnetic material, and a gauge head, said gauge head and magnetic member being relatively movable, biased toward each other, and adapted to have sheet material to be gauged passed therebetween, said gauge head including a flux carrying element, a permanent magnet producing a magnetomotive force for passing a unidirectional magnetic flux through said element and said sheet to be gauged, a second permanent magnet mounted so as to exert a magnetomotive force acting upon said element in opposition to the first-mentioned magnetomotive force, thus tending to pass magnetic flux through said element in the opposite direction from the first-mentioned flux and means responsive to the magnitude of the resultant flux produced by the differential magnetomotive forces.

CLAUDE M. HATHAWAY.